United States Patent
Faure et al.

(10) Patent No.: US 7,574,138 B2
(45) Date of Patent: Aug. 11, 2009

(54) DYNAMIC CONTROL OF THE LEVEL OF DEGRADATION OF OPTICAL SIGNALS IN A TRANSPARENT OPTICAL COMMUNICATION NETWORK

(75) Inventors: Jean-Paul Faure, Paris (FR); Vincent Bouder, Paris (FR)

(73) Assignee: Alcatel, Paris (FR)

( * ) Notice: Subject to any disclaimer, the term of this patent is extended or adjusted under 35 U.S.C. 154(b) by 477 days.

(21) Appl. No.: 10/753,328

(22) Filed: Jan. 9, 2004

(65) Prior Publication Data

US 2004/0179838 A1 Sep. 16, 2004

(30) Foreign Application Priority Data

Jan. 10, 2003 (FR) .................................. 03 00214

(51) Int. Cl.
*H04J 14/02* (2006.01)
*H04B 10/00* (2006.01)
*H04B 10/02* (2006.01)

(52) U.S. Cl. ........................... 398/94; 398/93; 398/158; 398/160; 398/177

(58) Field of Classification Search ..................... 398/9, 398/14, 25, 26, 33, 34, 177, 93, 94, 158, 398/160

See application file for complete search history.

(56) References Cited

U.S. PATENT DOCUMENTS

| 6,317,231 B1* | 11/2001 | Al-Salameh et al. | 398/34 |
| 6,400,479 B1 | 6/2002 | Zhou et al. | |
| 6,668,137 B1* | 12/2003 | Cordina | 398/94 |
| 2003/0063343 A1* | 4/2003 | Pheiffer et al. | 359/110 |
| 2004/0208531 A1* | 10/2004 | Bosloy et al. | 398/33 |

FOREIGN PATENT DOCUMENTS

| EP | 1 130 803 A2 | 9/2001 |
| WO | WO 02/071670 A2 | 9/2002 |

* cited by examiner

*Primary Examiner*—Dalzid Singh
(74) *Attorney, Agent, or Firm*—Sughrue Mion, PLLC

(57) ABSTRACT

A device (D2) is dedicated to controlling degradation parameters associated with signals on channels with different wavelengths, possibly arranged in bands of channels, and transmitted by transmission lines (Lj) connecting nodes (Ni) of a transparent optical communication network. The device includes processing means (PM2) adapted, in the event of transmission of signals of at least two channels or bands of channels by at least one transmission line (Lj), to measure for each of said channels or each of said bands of channels, firstly, the value of a parameter representative of the degradation of the signals on the corresponding line (Lj) and, secondly, taking account of said measured values, a power profile to be imposed on the signals so that they have predetermined degradation parameter values.

15 Claims, 3 Drawing Sheets

DYNAMIC CONTROL OF THE LEVEL OF DEGRADATION OF OPTICAL SIGNALS IN A TRANSPARENT OPTICAL COMMUNICATION NETWORK

BACKGROUND OF THE INVENTION

The field of the invention is that of optical transmission of signals within optical networks referred to as "wavelength switching networks" or "band of wavelength switching networks", also known as transparent networks.

In transparent networks, many factors can lead to inconsistencies between channels with different wavelengths in terms of performance, i.e. in terms of the quality of the signals received after transmission. This applies in particular to chromatic dispersion and amplification gain variation.

To remedy this problem, power balancing methods have been proposed with the intention of obtaining substantially constant performance from one channel to another.

These methods are suitable for "point to point" connections in which the channels of the same band take the same path and are therefore subjected to the same degradation. However, in the transparent networks previously cited, the channels present on the same transmission line (optical fiber) portion can come from different network portions and the signals in those channels can therefore have very different optical characteristics. This makes it difficult to balance performance between channels.

Each channel of an optical fiber can be optimized individually, of course, but this can degrade the performance of other channels in the optical fiber because they are interdependent because of gain coupling between the cascaded amplifiers of the transmission lines of the network.

Optimizing the balancing of channel performance is nevertheless possible in this type of transparent network, in theory, provided that certain parameters associated with the signals of each channel and related to their quality are available, for example the error rate, the optical signal to noise ratio (OSNR) and the power (optical power). This is rarely the case, however.

In practice, the performance of the channels on the longest path of the network is optimized at the design stage. To this end, the OSNR values associated with certain selected channels are determined at the end of the longest path, for example using optical spectrum analyzers (OSA) or dedicated equipment such as optical performance monitors (OPM), whilst maintaining the other channels at predefined power levels taking account of the characteristics of the network.

This kind of optimization is unsatisfactory for at least three reasons. First of all, only the channels that take the longest path are considered as potentially penalized and likely to require balancing of performance. Now this is true only provided that the other channels take shorter paths and have a large quality margin, which would compromise the very structure of the network. Secondly, because of its static nature, this kind of optimization cannot substitute non-optimized channels for optimized channels. This is because this would require the channels that take shorter paths to be at lower power levels, whilst using higher power levels for the more heavily penalized channels, which is not compatible with static processing. Finally, and again because of its static nature, this kind of optimization is incompatible with dynamic channel allocation and/or transmission line reconfiguration mechanisms.

Thus an object of the invention is to improve on this situation.

SUMMARY OF THE INVENTION

To this end it proposes a method of controlling degradation parameters, for example the variation ($\delta$OSNR) of the optical signal to noise ratio, associated with signals of channels with different wavelengths, possibly arranged in bands of channels, and transmitted by transmission lines connecting nodes of a transparent optical communication network.

In the present context, the term "node" refers to a communication equipment for switching and/or routing wavelengths or bands of wavelengths within a transparent network. A node can therefore be a cross-connect unit.

The method is characterized in that it comprises the following steps:

a) measuring for each of at least two channels or bands of channels for at least one transmission line a value of a parameter (for example $\delta$OSNR) representative of the degradation to which signals of said channels or bands of channels are subjected in said line, and b) determining for said channels or said bands of channels, taking account of said measured values, a power profile to be imposed on signals of said channels so that they have predetermined degradation parameter values.

According to another feature of the invention, the power profile is applied in a network node at an upstream end of the transmission line. In other words, a power profile is preferably applied, not to the received signals from which the value of the degradation parameter was determined, but to the next signals to be conveyed by the transmission line.

The degradation parameter values are preferably selected in step b) so that they are included in a range of selected (possibly zero) width or a tolerance of selected (possibly zero) amplitude. In this case, it is advantageous to provide an iterative mechanism consisting in repeating steps a) and b), for example varying a processing increment on each iteration, until the degradation parameter values are all included in the selected range.

Moreover, it may be advantageous, in particular if the network switches bands of wavelengths, to equalize the gains of the channels of the various bands in each transmission line as a function of their respective wavelengths, before the signals are received at the node concerned.

The invention also provides a device for controlling degradation parameters, for example $\delta$OSNR, associated with signals on channels with different wavelengths, possibly arranged in bands of channels, and transmitted by transmission lines connecting nodes of a transparent optical communication network.

The device is characterized in that it includes processing means adapted, in the event of transmission of signals of at least two channels or bands of channels by at least one transmission line, to measure for each of said channels or each of said bands of channels, firstly, the value of a parameter, for example $\delta$OSNR, representative of the degradation of the signals on the corresponding line and, secondly, taking account of said measured values, a power profile to be imposed on the signals so that they have predetermined degradation parameter values.

The processing means are preferably adapted to select the degradation parameter values so that they are included in a range of selected (possibly zero) width or a tolerance of selected (possibly zero) amplitude. In this case, it is advantageous for the processing means to be adapted to determine the degradation parameter values iteratively, for example varying a processing increment on each iteration, until the degradation parameter values are included in the selected range.

Moreover, it is particularly advantageous for the processing means to comprise a power control module adapted to impose the corresponding determined power profiles on the signals before they are fed into an outgoing transmission line. The power control module is preferably adapted to impose particular power profiles in a network node at an upstream end of the transmission line concerned.

For example, a control device of the above kind can be integrated into a node or management server type communication equipment of a transparent network. It can therefore operate either locally on a node or centrally on a multiplicity of nodes.

BRIEF DESCRIPTION OF THE DRAWINGS

Other features and advantages of the invention will become apparent on reading the following detailed description and examining the appended drawings, in which.

The figures can not only constitute part of the description of the invention but also, if necessary, contribute to the definition of the invention.

DETAILED DESCRIPTION OF THE INVENTION

The invention relates to transparent optical communication networks of the wavelength switching type and the band of wavelength switching type, for example wavelength division multiplexing (WDM) networks and dense wavelength division multiplexing (DWDM) networks.

Figure 1:
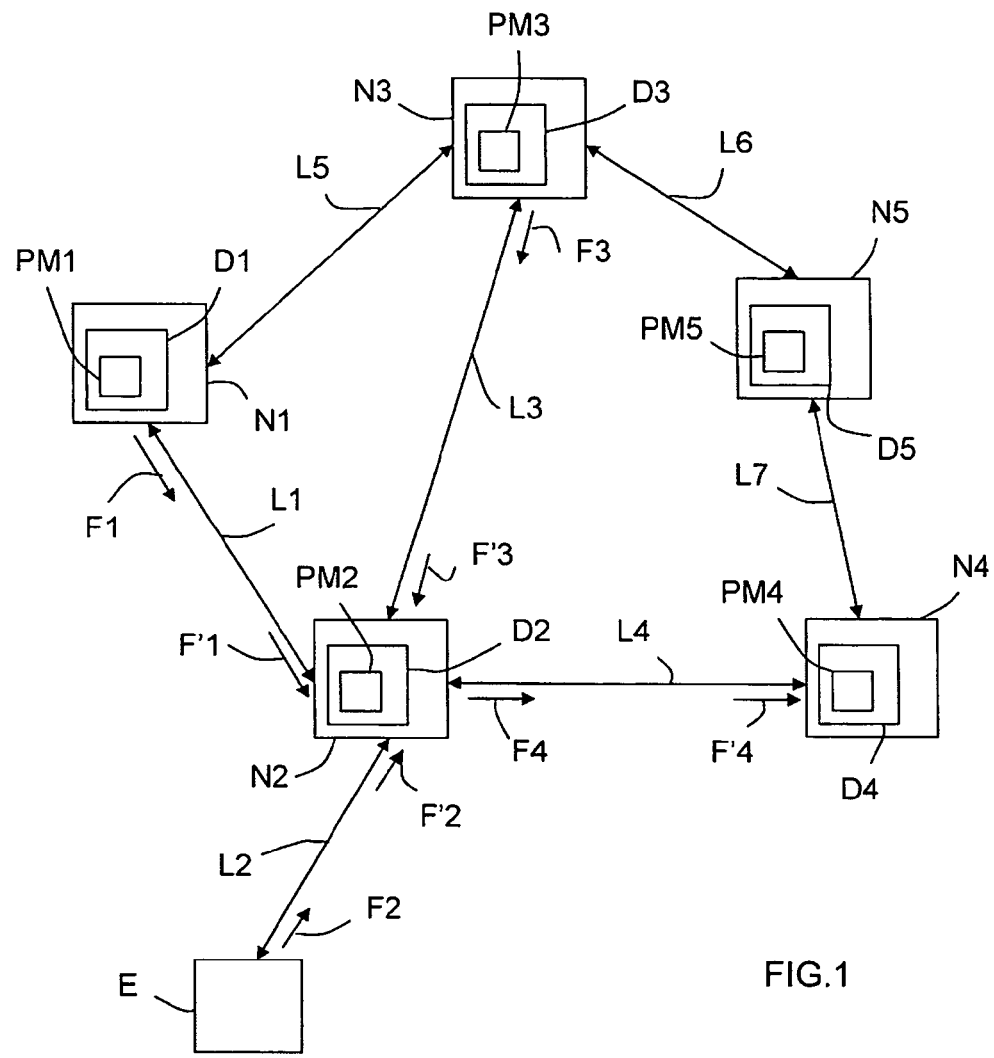
FIG. 1 shows diagrammatically a portion of a transparent network equipped with control devices according to the invention.

As shown in FIG. 1, these transparent networks generally comprise a multiplicity of communication equipments, such as servers E or cross-connect units Ni (here i=1 to 5), interconnected by optical transmission lines Lj (here j=1 to 7).

An optical transmission line Lj generally comprises one or more line portions, also known as spans, comprising one or more optical fibers coupled to an optical amplifier. Each optical fiber is capable of transmitting channel signals C which are assigned particular wavelengths. When the network switches bands of wavelengths, the channels C are grouped into bands of substantially constant width, in which they are substantially equidistant from each other.

The cross-connect units constitute optical nodes Ni for switching and/or routing wavelengths or bands of wavelengths within the transparent network. A cross-connect unit can be of the add/drop type, for example, for adding/dropping resources, in particular optical resources. Depending on the envisaged granularity and the type of network, a resource can be a packet of data, a wavelength or a band of wavelengths.

A transmission line Lj connecting two adjacent nodes Ni can therefore be considered as a cascade of spans that degrades the signals between the two nodes and consequently introduces performance inconsistencies between the channels conveyed by different transmission lines.

An object of the invention is to optimize the balancing of performance between channels.

To this end it proposes a device D dedicated to controlling degradation parameters associated with signals on channels C with different wavelengths. As shown in FIG. 1, each node Ni of the transparent network is preferably equipped with a device Di according to the invention, for optimizing the performance of the channels that reach it on one or more incoming lines and that it must retransmit on one or more outgoing lines. However, in a different embodiment, there could be only one device D, for example installed in a network management server, and operating on all the nodes of the network in a centralized manner. A plurality of devices D could equally be provided, installed in different network management servers, and operating on some nodes of said network in a centralized manner.

The transparent network described hereinafter is a wavelength switching network. The control device Di comprises a processing module PMi; in the event of transmission of signals of at least two channels or bands by a transmission line Lj, at the ends of which are an upstream node Ni, in which it is installed, and a downstream node Ni', the processing module determines for each of said channels, firstly, the value of a parameter representative of the degradation of the signals in the corresponding line and, secondly, a sending power profile taking account of the values so determined and to be imposed on the signals so that they have a selected degradation parameter value.

To facilitate an understanding of the invention, there is described hereinafter one example of the operation of the control device D2, which is installed in the node N2.

In the example shown in FIG. 1, the node N2 is connected, firstly, to the node N1 by the transmission line L1, secondly, to the server E by the transmission line L2, thirdly, to the node N3 by the transmission line L3, and, fourthly, to the node N4 by the transmission line L4.

Figure 3A:
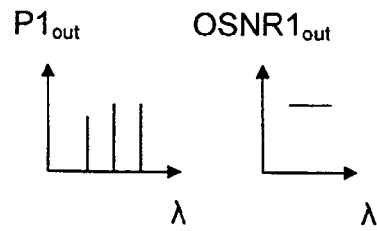
FIGS. 3A to 3C are diagrams depicting the power of the channel signals at the output of the node N1, the equipment E, and the node N3, respectively, and the associated OSNR values, as a function of the wavelength.

For example, the node N1 has received at one of its add ports three channels C1 with different wavelengths carrying signals that it must transmit to the node N4 via the node N2. The signals of the three channels C1 are fed into the line L1, as shown by the arrow F1, with powers $P1_{out}$, and an optical signal to noise ratio $OSNR1_{out}$, shown in FIG. 3A as a function of the wavelength λ. In this example, the powers of the signals of the three channels C1 are different, but this is not necessarily so. Moreover, the OSNR here is the same for the signals of the three channels C1, but this is not necessarily so either.

Figure 3B:
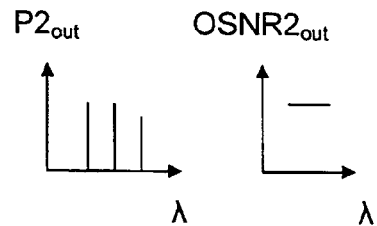

In this example, the server E requires to transmit signals of three channels C2 with different wavelengths to the node N4 via the node N2. The signals of the three channels C2 are fed into the line L2, as shown by the arrow F2, with powers $P2_{out}$ and an optical signal to noise ratio $OSNR2_{out}$, shown in FIG. 3B as a function of the wavelength λ. In this example, the powers of the signals of the three channels C2 are different, but this is not necessarily so. Moreover, the OSNR here is the same for the signals of the three channels C2, but this is not necessarily so either.

Figure 3C:
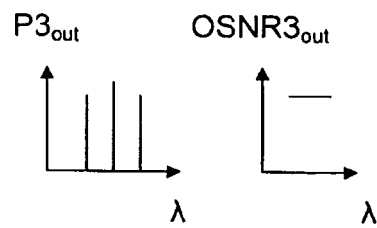

Finally, in this example, the node N3 receives at one of its add ports three channels C3 with different wavelengths carrying signals that it must transmit to the node N4 via the node N2. The signals of the three channels C3 are fed into the line L3, as shown by the arrow F3, with powers $P3_{out}$ and an optical signal to noise ratio $OSNR3_{out}$, represented in FIG. 3C as a function of the wavelength $\lambda$. In this example, the powers of the signals of the three channels C3 are different, but this is not necessarily so. Moreover, the OSNR here is the same for the signals of the three channels C3, but this is not necessarily so either.

The signals of the channels C1, C2 and C3 therefore travel in the lines L1, L2 and L3 and reach the input ports of the node N2 as shown by the arrows F'1, F'2 and F'3, respectively. On reaching these ports, the channels have inconsistent performance because they have traveled in different lines. To be more precise, the signals have been subjected to a level of degradation that can be quantified by a degradation parameter, for example the OSNR, or to be more precise the OSNR variation, designated $\delta OSNRk$ (here k=1 to 3).

It is considered hereinafter that the degradation parameter used by the processing module PM2 of the device D2 to optimize the performance of the channels C is the OSNR variation $\delta OSNR$. However, a different parameter could be used, for example the variation of the error rate or of the quality factor Q or of the deformation of the eye (superposition of all the 0 or 1 frames that travel on a line).

Figure 4A:
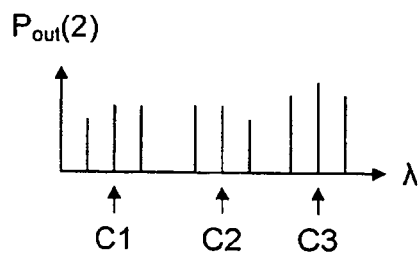
FIGS. 4A and 4B are diagrams respectively depicting the power of the channel signals C1 to C3 at the output of the node N2 and the associated OSNR values, before processing by the device according to the invention.
Figure 4B:
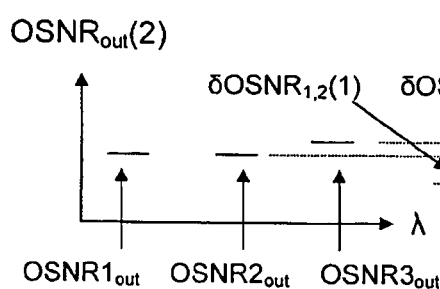

The powers $P_{out}(2)$ and the optical signal to noise ratios $OSNR_{out}(2)$ of the signals of the channels C1, C2 and C3 at the output of the node N2 are grouped together in FIGS. 4A and 4B, respectively. Similarly, the powers $P_{in}(4)$ and the optical signal to noise ratios $OSNR_{in}(4)$ of the signals contained in the channels C1, C2 and C3 at the input of the node N4 are grouped together in FIGS. 5A and 5B, respectively.

Figure 5A:
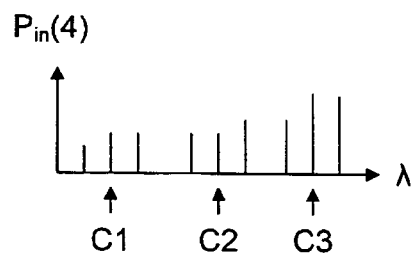
FIGS. 5A and 5B are diagrams respectively depicting the power of the channel signals C1 to C3 at the input of the node N4 and the associated OSNR values, before processing by the device according to the invention.
Figure 5B:
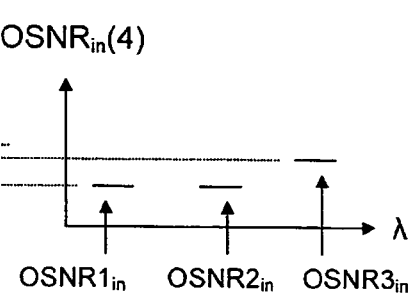

Thus FIGS. 4A and 5A show the power variations of the channels C1, C2 and C3 between the input (FIG. 4A) and the output (FIG. 5A) of the line L4, before processing by the device according to the invention. Similarly, FIGS. 4B and 5B show the variations $\delta OSNR(1)$ of the optical signal to noise ratios of the various channels (C1, C2 and C3) induced by the cascaded spans of the line L4, before processing by the device according to the invention.

In the example depicted in FIGS. 4 and 5, it can be seen that the OSNR variations $\delta OSNR_{1,2}(1)$ to which the channel signals C1 and C2 on the line L4 are subjected are substantially identical, but differ from that $\delta OSNR_3(1)$ to which the signals of the channels C3 are subjected. This compromises performance, and the control device D2 is intended to remedy this.

Figure 2:
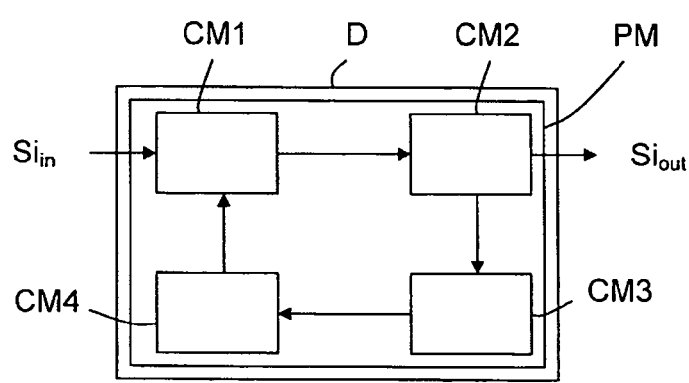
FIG. 2 shows diagrammatically one embodiment of a control device according to the invention.

As shown in FIG. 2, the degradations introduced by the line concerned (here the line L4) are measured, in other words, in the present context, the OSNR variations $\delta OSNR(1)$, also known as degradation parameter values, are determined by a first calculation module CM1 that is preferably part of the processing module PM2 (although this is not obligatory). Many techniques well known to the person skilled in the art can be used to determine at a node Ni the optical signal to noise ratios and the powers associated with the signals $Si_{out}$ contained in the various channels received and sent, and to deduce therefrom the OSNR variations $\delta OSNR$ induced by the transmission lines Lj to which the node Ni is connected. As these techniques are not the subject matter of the invention, they are not described here. For example, the optical performance monitoring (OPM) technique may be used.

When the first calculation module CM1 of the node N2 is in possession of the optical signal to noise ratios $OSNR1_{out}(2)$, $OSNR2_{out}(2)$ and $OSNR3_{out}(2)$ of the channels C1, C2 and C3 at the output of the node N2 and the optical signal to noise ratios $OSNR1_{in}(4)$, $OSNR2_{in}(4)$ and $OSNR3_{in}(4)$ at the input of the node N4, it communicates them to a comparison module CM2 of the processing module PM2 of the node N2, in order for the latter module to compare them.

To be more precise, the comparison module CM2 compares the input and output optical signal to noise ratios of each channel received from the first calculation module CM1, in order to determine the differences $\delta OSNR$ between them and to compare those differences to a range of selected width or a tolerance of selected amplitude. That width or amplitude can be made as small as may be required. It can even be zero.

If the differences of the various optical signal to noise ratios $\delta OSNR_1(1)$, $\delta OSNR_2(1)$ and $\delta OSNR_3(1)$ are included within the selected range or tolerance, then the processing terminates. The signals of the channels C1, C2 and C3, which are referred to as outgoing signals $Si_{out}$, continue to the node N4 on the line L4, as shown by the arrows F4 and F'4. The signals fed into the line L4 then have output powers $P_{out}(2)$.

On the other hand, if the differences $\delta OSNR_1(1)$, $\delta OSNR_2(1)$ and $\delta OSNR_3(1)$ between the optical signal to noise ratios are not within the selected range or tolerance, then the comparison module CM2 communicates them to a second calculation module CM3 for determining for each channel, taking account of the associated optical signal to noise ratios, a power profile to be imposed on the signals so that they have a selected $\delta OSNR(2)$ at the output of the line L4.

By applying specific power profiles to signals contained in channels defined in the same optical fiber, the quantities of noise added to the transmission line considered are modified, and it is therefore possible to control the relative degradations between the output optical signal to noise ratios, and thereby to control the performance degradation between the channels on the line concerned.

Figures 6A, 7A:
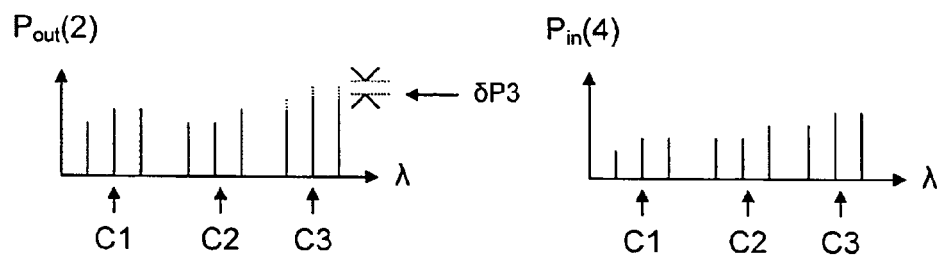
FIGS. 6A and 6B are diagrams respectively depicting the power of the channel signals at the output of the node N2 and the associated OSNR values, after processing by the device according to the invention.
FIGS. 7A and 7B are diagrams respectively depicting the power of the channel signals at the input of the node N4 and the associated OSNR values, after processing by the device according to the invention.
Figures 6B, 7B:
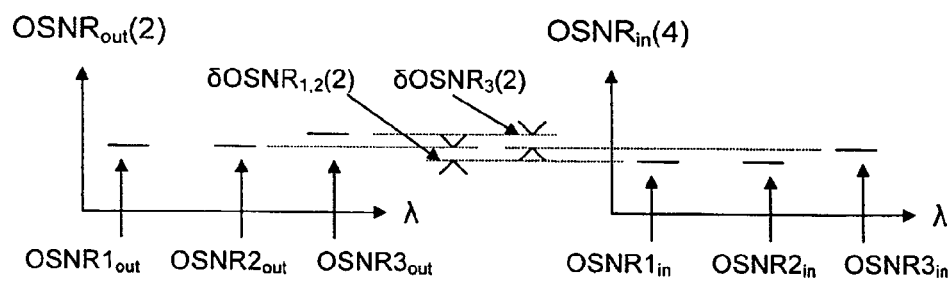

Thus, in the example depicted in FIG. 6A, the second calculation module decides not to modify the powers of the signals of the channels C1 and C2, but reduces by an amount $\delta P3$ the power of the signals of the channels C3. As shown in FIGS. 6A, 6B, this variation $\delta$ strengthens the relative value of the signals of the channels C1 and C3, which is reflected in a small increase in the noise added to the channels C3 and a large reduction in the noise added to the channels C1 and C2. This is reflected directly in an optical signal to noise ratio degradation variation on the line L4.

As can be seen in FIG. 6B, in this example, the output optical signal to noise ratios $OSNR1_{out}(2)$, $OSNR2_{out}(2)$ and $OSNR3_{out}(2)$ of the channels C1, C2 and C3 are not equal, as is generally the case. However, this does not prevent equalization of the degradation of the optical signal to noise ratios on the line L4.

When the second calculation module CM3 has determined the power profiles to be imposed on the signals of the channels C1, C2 and C3, it communicates them to the power control module CM4 for applying them in the node N2 at the upstream end of the transmission line L4. Consequently, each power profile is preferably applied, not to the signals received by the node N4, but to the next signals to be conveyed by the transmission line L4, and to be received by the node N4 subsequently. In other words, the profile determined is applied to signals following the signals on which the detection is effected.

To this end, each power control module CM4 comprises an attenuation module for applying an attenuation spectrum to the signals that is suitable for the power profile that has been determined, which can be of any variable form.

When the profiles have been applied to the following signals received, in the node N2, they are communicated to the first calculation module CM1, which determines their respective optical signal to noise ratios, and then communicates them to the comparison module CM2, for it to verify that the corresponding δOSNR values are included in the range of selected width or the tolerance of selected amplitude.

It is preferable to verify if the output δOSNR values are included in the range of selected width or the tolerance of selected amplitude, because applying the various power profiles that have been calculated does not always vary all of the output optical signal to noise ratios, as theory would indicate.

In order to have the δOSNR values converge toward the values selected (predicted) by the calculation effected by the second calculation module CM3, the processing module PM2 can be adapted to operate in an iterative manner. To be more precise, until convergence is obtained, i.e. for as long as the measured δOSNR values are not all included in the range of selected width or the tolerance of selected amplitude, the processing module PM2 executes processing loops CM2→CM3→CM4→CM1→CM2. Generally speaking, the processing loops can adapt the calculation methods of the second calculation module CM3 to the state of the system, where applicable taking account of its past, using algorithms that may be very complex. For example, the increment of the calculation algorithm employed by the second calculation module CM3 can be varied in each loop.

Each loop is applied to different signals to which the profiles determined in the preceding loop have been applied.

The processing terminates when convergence has been obtained, i.e. when the various δOSNR values $\delta OSNR_1(2)$, $\delta OSNR_2(2)$ and $\delta OSNR_3(2)$ are all included in the selected range or tolerance.

The signals of the channels C1, C2 and C3 travel on the same transmission line (the transmission line L4 in this example), with degradation parameter values δOSNR that are of the same order of magnitude, or even identical, and therefore are subjected to the same degradation, as shown in FIGS. 7A and 7B.

FIGS. 6A and 7A are at the same level to facilitate observing the power variations on the channels C1, C2 and C3 induced by the cascade of spans of the line L4, after processing by the device according to the invention. Similarly, FIGS. 6B and 7B are at the same level to facilitate observing the optical signal to noise ratio variations δOSNR(2) of the channels C1, C2 and C3 induced by the cascade of spans of the line L4, after processing by the device according to the invention. In FIGS. 7A and 7B, $P_{in}(4)$, $OSNR_{in}(4)$ and $\delta OSNR(2)$ respectively designate the power of the signals at the input ports of the node N4, the optical signal to noise ratios of the signals at the input ports of the node N4, and the optical signal to noise ratio variation (degradation) introduced by the line L4, after processing by the device according to the invention.

As can be seen in FIGS. 6B and 7B, in the example shown the optical signal to noise ratio variation $\delta OSNR_1(2)$ to which the channels C1 are subjected is substantially identical to the optical signal to noise ratio variation $\delta OSNR_2(2)$ to which the channels C2 are subjected, which is substantially identical to the optical signal to noise ratio variation $\delta OSNR_3(2)$ to which the channels C3 are subjected. In other words, the difference that existed at the output of the node N2 between $OSNR3_{out}(2)$, on the one hand, and $OSNR1_{out}(2)$ and $OSNR2_{out}(2)$, on the other hand, have been substantially maintained (or preserved) as far as the input of the node N4.

If the signals must be retransmitted on one or more outgoing lines of the node N4, further processing may be applied to them by the control device D4 of the node N4. This is useful in particular if new channels coming from an add port of the node N4 or another node, for example the node N5, must be retransmitted on an outgoing line and/or if the comparison range or tolerance used by the comparison module CM2 of the node N4 is narrower than that used by the preceding node N2. It is in fact important to note that the ranges used by the devices Di of the network are not necessarily the same. In particular, this makes it possible to take account of the different levels of security and service that the outgoing transmission lines of the various network nodes can support.

To facilitate the processing effected by the control device Di installed in a node Ni, it may be advantageous to equalize the gains of the channels upstream of said node Ni, as a function of their respective wavelengths. This is more particularly useful if the network switches bands of wavelengths.

This gain equalization technique is well known to the person skilled in the art. Consequently, it is not described here. It is preferably effected by filters coupled to the relay amplifiers installed in the transmission lines.

Moreover, the processing is substantially the same if the control device D must process multiplexes comprising a plurality of bands of wavelengths each comprising a plurality of equidistant channels, for example five channels. In fact it suffices to consider each band as a channel, and consequently to determine the optical signal to noise ratio associated with each band, and then the power profile to be imposed on each band, allowing for the optical signal to noise ratios associated with the various bands received.

The control device D, to be more precise its first and second calculation modules CM1 and CM3, its comparison module CM2, and its power control module CM4, can take the form of electronic circuits (hardware), data processing modules (software), or a combination of hardware and software.

The invention also provides a method of controlling degradation parameters, for example δOSNR values, associated with signals Si in channels Ck with different wavelengths, possibly arranged into bands of channels, and defined in transmission lines Lj interconnecting the nodes Ni of a transparent optical communication network.

The method can be implemented by at least one control device D and one transparent network of the type described hereinabove. The main and optional functions and subfunctions provided by the steps of the method being substantially identical to those provided by the various means constituting the control device D and/or the transparent network, only the steps implementing the main functions of the method according to the invention are summarized hereinafter.

That method comprises the following steps:
  a) determining for each of at least two channels Ck or bands of channels of at least one transmission line Lj a value of a parameter representative of the degradation of the signals in the line Lj, and
  b) determining for each of the channels, or each of the bands of channels, taking account of the values so determined, a power profile to be imposed on the signals for them to have a selected degradation parameter value.

The degradation parameter values selected in step b) are preferably included in a range of selected (possibly zero) width or a tolerance of selected (possibly zero) amplitude. In this case, it is advantageous to provide an iterative mechanism that repeats steps a) and b), for example varying a processing increment in each iteration, until the degradation parameter values are all included in the selected range or tolerance.

Moreover, it may be advantageous, especially if the network switches bands of wavelength, to equalize in each transmission line the gains of the channels Ck of the various bands as a function of their respective wavelengths, before the signals $Si_{in}$ are received at the node Ni concerned.

Thanks to the invention, the complex problem of optimizing the performance of the channels of a transparent network is segmented and consequently facilitated. This segmentation further facilitates optimizing the design of networks, transmission line by transmission line.

Moreover, because of its dynamic nature, optimization is now compatible, firstly, with transmission line adjustments imposed by their aging and, secondly, with routing reconfiguration.

Moreover, the invention can optimize all the channels globally and simultaneously.

Finally, thanks to the invention, it is possible to adjust the optimization to provide varying qualities of service.

The invention is not limited to the embodiments of the method, the control device Di and the network equipments Ni described hereinabove, by way of example only, but encompasses all variants within the scope of the following claims that the person skilled in the art might envisage.

Thus, the foregoing description covers one example of the use of a control device in accordance with the invention in which the n channels on the same transmission line have different powers but the same optical signal to noise ratio. However, the control device of the invention is equally suitable for the situation in which the n channels on the same transmission line have different powers and different optical signal to noise ratios.

Moreover, the foregoing description covers an application of the device according to the invention to power control. However, the invention is not limited to that parameter. It relates equally to other parameters, for example chromatic dispersion, polarization state, wavelength fluctuation (chirping), and phase state.

The invention claimed is:

1. A method of controlling degradation parameters associated with signals of channels with different wavelengths, arranged in bands of channels, and transmitted by transmission lines connecting nodes of a transparent optical communication network, the method comprising:
   measuring a value of a parameter representative of signal degradation for signals in each of at least two channels or bands of channels for at least one transmission line;
   comparing the measured values of the input and output degradation parameters of said at least two channels or band of channels;
   determining a power profile to be applied to said signals based on said measured values so that said channels or bands of channels have specified degradation parameter values; and
   applying said power profile to said signals in a node of the network at an upstream end of said transmission line.

2. A method according to claim 1, wherein said degradation parameter is the variation of the optical signal to noise ratio on said transmission line.

3. A method according to claim 1, wherein said degradation parameter values are included in a range of a selected width.

4. A method according to claim 3, wherein said measuring a value of a parameter representative of signal degradation and said determining a power profile to be applied to said signals are iterated until said degradation parameter values are included in said range.

5. A method according to claim 3, wherein said range has a width equal to zero.

6. A method according to claim 1, wherein before said signals are received the gains of said channels on said transmission line are equalized as a function of their respective wavelengths.

7. The method according to claim 1, wherein the degradation parameters are optical signal to noise ratio (OSNR) variations.

8. A device for controlling degradation parameters associated with signals on channels with different wavelengths, arranged in bands of channels, and transmitted by transmission lines connecting nodes of a transparent optical communication network, the device comprising:
   at least one transmission line; and
   a processing module,
   wherein said processing module measures a value of a parameter representative of a degradation of said signals for each of said channels or each of said bands of channels on at least one said transmission line, compares the measured values of the input and output degradation parameters of said at least two channels or band of channels, determines a power profile to be applied to said signals based on said measured value, so that the signals have specified degradation parameter values, and applies said power profile to said signals in a node of the network at an upstream end of said transmission line.

9. A device according to claim 8, wherein said degradation parameter determined by said processing module is a variation in the optical signal to noise ratio on said transmission line.

10. A device according to claim 8, wherein said processing module determines said degradation parameter values so that said degradation parameter values are included in a range of selected width.

11. A device according to claim 10, wherein said processing module iterates said determination of degradation parameter values until said degradation parameter values are included in said range.

12. A device according to claim 10, wherein said range has a width equal to zero.

13. A device according to claim 8, wherein said processing means comprise a power control module which applies power profiles to said signals before said signals are fed into said transmission line.

14. A device according to claim 13, wherein said power control module applies power profiles in a node of the network at an upstream end of said transmission line.

15. The device according to claim 8, wherein the degradation parameters are optical signal to noise ratio (OSNR) variations.

* * * * *

UNITED STATES PATENT AND TRADEMARK OFFICE
CERTIFICATE OF CORRECTION

PATENT NO. : 7,574,138 B2  
APPLICATION NO. : 10/753328  
DATED : August 11, 2009  
INVENTOR(S) : Faure et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 891 days.

Signed and Sealed this

Seventh Day of September, 2010

David J. Kappos  
*Director of the United States Patent and Trademark Office*